United States Patent Office 3,133,964
Patented May 19, 1964

3,133,964
BENZAMIDES
Bruce W. Horrom, Waukegan, Ill., assignor to Abbott Laboratories, North Chicago, Ill., a corporation of Illinois
No Drawing. Filed Sept. 18, 1962, Ser. No. 224,512
7 Claims. (Cl. 260—559)

The present invention relates to substituted aromatic amides of the propynylamines. More particularly, it is concerned with the 1,1-dialkylpropynylamides of 3,4,5-trimethoxybenzoic acid and 3,4,5-trimethoxycinnamic acid, and with a method for the preparation of such compounds.

The novel compounds of this invention are represented by the formula

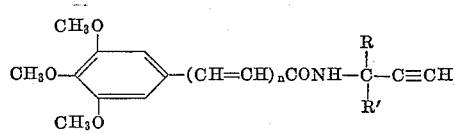

wherein $n$ is 0 or 1 and wherein R and R' are loweralkyls.

Essentially, the new compounds are made by reacting 3,4,5-trimethoxybenzoic acid (or 3,4,5-trimethoxycinnamic acid) or its corresponding reactive derivative with a propynylamine which is disubstituted with loweralkyls in the 1-position. The alkyl substituents of this propynylamine may be straight-chain or branched hydrocarbon groups containing up to four carbon atoms each. These propynylamines are made by the method of G. F. Hennion and E. G. Teach, described in J.A.C.S. volume 75, pages 1653-4 (1953). The reactive derivative of the trimethoxy aromatic acid specified above includes the acid halide or the loweralkyl ester thereof.

In the preferred embodiment, the reaction between the trimethoxybenzoic acid (or cinnamic acid) chloride and the 1,1-dialkylpropynylamine is carried out in the presence of an acid acceptor, i.e. a trialkylamine, an N,N-dialkylamine, an alkali carbonate, an earth alkali carbonate, an earth alkali bicarbonate, an alkali bicarbonate, etc. or an excess of the selected propynylamine used as one of the reactants. The reaction may be performed in an inert diluent such as ether, acetone, ethyl acetate, benzene, toluene, xylene, dimethylacetamide, dimethylformamide, or similar inert organic liquids. The term "inert" is used here to express that such a diluent is unreactive with the participants of the reaction, the end product, and the acid acceptor where the latter is used. The reaction can be performed within a temperature range of between —20° C. and +50° C. or the boiling point of the diluent, whichever is lower. A satisfactory temperature for the reaction is room temperature. The new amides can be separated from the reaction mixture by evaporation of the solvent, by precipitation with water, or similar known procedures. In all cases, almost quantitative yields are obtainable.

The new substituted benzamides and cinnamides are useful as muscle relaxants; they possess the pharmacological properties of relaxing skeletal muscles through inhibition of synaptic transmission in the spinal cord as distinguished from the neuro-muscular blocking action of compounds of the curare-type, or the severely central nervous-system depressing compounds such as the barbiturates. The new compounds are also useful as tranquilizers and anti-convulsants. As anti-convulsants, they are particularly effective in shock treatments with electroshock or with Metrazol® (7,8,9,10-tetrazabicyclo-[5.3.0]-8,10-decadiene).

The following examples are presented to teach the invention in more detail but should not be construed as exclusive embodiments of the invention. They are given only to illustrate the preparation of some members of the heretofore unknown series of N-(1,1-dialkylpropynyl)-3,4,5-trimethoxybenzamides or the corresponding cinnamides.

EXAMPLE 1

*N-(1-Ethyl-1-Methylpropynyl)-3,4,5-Trimethoxybenzamide*

A solution of 80 cc. of thionyl chloride in 80 cc. of dry benzene and 1 cc. of dimethylformamide is refluxed with 21.2 grams of 3,4,5-trimethoxybenzoic acid until the evolution of hydrochloric acid gas ceases. The mixture is then concentrated on a steam bath and 80 cc. of dry benzene is added. Reconcentration of this mixture is followed by the addition of 50 cc. of dimethylacetamide at room temperature. The solution obtained is added dropwise to a solution of 10.2 grams of triethylamine and 9.7 grams of 1-ethyl-1-methylpropynylamine in 50 cc. of dimethylacetamide. After completion of the addition, the mixture is stirred for 2 hours at room temperature and then poured into a large volume of water. The resulting oil is extracted with ether and the ether extraction is separated, washed in turn with a 10% potassium hydroxide solution, dilute hydrochloric acid, and water. The ether solution is decolorized with activated carbon, filtered, and dried over magnesium sulfate. After filtration of the magnesium sulfate the ether is evaporated, leaving crude N-(1-ethyl-1-methylpropynyl)-3,4,5-trimethoxybenzamide. After recrystallization of this material from Skellysolve B (a saturated hydrocarbon mixture predominantly consisting of hexane), the pure material is obtained, melting at 133-134° C. Chemical analysis of this compound corresponds closely with the calculated values for N-(1-ethyl-1-methylpropynyl)-3,4,5-trimethoxybenzamide.

The new compound has an oral $LD_{50}$ of about 2000 mg./kg. and an intraperitoneal $LD_{50}$ of 900 mg./kg. in mice. The effective dose in rats is 250 mg./kg. intraperitoneally for muscle-relaxing activity.

EXAMPLE 2

*N-(1-Methyl-1-n-Propylpropynyl)-3,4,5-Trimethoxybenzamide*

By following the procedure of Example 1, but substituting 1-methyl-1-n-propylpropynylamine for the 1-methyl-1-ethylpropynylamine, N-(1-methyl-1-n-propylpropynyl)-3,4,5-trimethoxybenzamide is obtained in good yield as a crude precipitate. The reaction mixture is poured into water and the precipitate is filtered off and dried. Recrystallization of this product from Skellysolve B produces the pure product, melting at 120° C. of which an analytical sample shows close agreement with the calculated values for the compounds.

The oral $LD_{50}$ of this compound is above 2000 mg./kg. and the intraperitoneal $LD_{50}$ is 1200 mg./kg. in mice.

EXAMPLE 3

*N-(1-Methyl-1-n-Propylpropynyl)-3,4,5-Trimethoxycinnamide*

By following the procedure of Example 1 but substituting the 3,4,5-trimethoxybenzoic acid with the equimolar amount of 3,4,5-trimethoxycinnamic acid and replacing the 1-ethyl-1-methylpropynylamine with the equimolar amount of 1-methyl-1-n-propylpropynylamine, N-(1-methyl-1-n-propylpropynyl)-3,4,5-trimethoxycinnamide is obtained in good yield as an amorphous product of which the chemical analysis is in agreement with the calculated values for the above compound.

The oral LD$_{50}$ for this compound is 1200 mg./kg. and the intraperitoneal LD$_{50}$ is 800 mg./kg. in mice.

EXAMPLE 4

N-(1-Ethyl-1-Methylpropynyl)-3,4,5-Trimethoxycinnamide

By following the procedure of Example 1 but replacing 3,4,5-trimethoxybenzoic acid with the equimolar amount of 3,4,5-trimethoxycinnamic acid, N-(1-ethyl-1-methylpropynyl)-3,4,5-trimethoxycinnamide is obtained in good yield. Recrystallization of the crude material produces a white, crystalline solid melting at 131° C. of which the chemical analysis is in close agreement with the calculated values for the compound.

The oral LD$_{50}$ for this new compound is above 1000 mg./kg. and the intraperitoneal LD$_{50}$ is 750 mg./kg. in mice.

EXAMPLE 5

N-(1,1-Dimethylpropynyl)-3,4,5-Trimethoxybenzamide

Following the procedure of Example 1 but substituting the equimolar amount of 1,1-dimethylpropynylamine for 1-ethyl-1-methylpropynylamine, produces N-(1,1 - dimethylpropynyl) - 3,4,5 - trimethoxybenzamide in good yields. The new compound has a melting point of 156–157° C. and its nitrogen analysis is in agreement with the calculated values for the compound.

EXAMPLE 6

N-(1,1-Dimethylpropynyl)-3,4,5-Trimethoxycinnamide

In analogy to Example 5 but replacing 3,4,5-trimethoxybenzoic acid with the equimolar amount of 3,4,5-trimethoxycinnamic acid, produces N-(1,1-dimethylpropynyl)-3,4,5-trimethoxycinnamide in good yields, melting at 137–138° C. A nitrogen analysis of the new compound corresponds closely to the calculated values for this compound.

Other compounds made according to the above examples are the N-(1-n-butyl-1-methylpropynyl)amides, the N - (1 - ethyl - 1 - propylpropynyl)amides, the N-(1-isobutyl-1-ethylpropynyl)amides, the N-(1,1-di-isopropylpropynyl)amides, the N-(1,1-diethylpropynyl)amides, the N-(1-n-butyl-1-ethylpropynyl)amides, the N-(1,1-n-dibutylpropynyl)amides, and similar 1,1-diloweralkylpropynylamides of 3,4,5-trimethoxybenzoic acid and 3,4,5-trimethoxycinnamic acid. Each of these compounds has an oral LD$_{50}$ of above 1000, mostly above 2000 mg./kg., while the corresponding intraperitoneal values are between 750 and 1200 mg./kg.

The tranquilizing and muscle-relaxing effects as well as the anti-convulsant activity of the new compounds are obtained in warm-blooded animals by the oral administration of between 50 and 150 mg./kg. in a 24-hour period. The active compounds may be administered alone or in combination with other drugs in any acceptable pharmaceutical form, e.g., as tablets, in capsules, or in solution, with the usual excipients, adjuvants, coatings, flavoring agents, etc.

Others may practice the invention in any of the numerous ways which will be suggested to one skilled in the art by the present disclosure. All such practice of the invention is considered a part hereof provided it falls within the scope of the appended claims.

I claim:

1. N-(1,1-diloweralkylpropynyl)amide of the formula

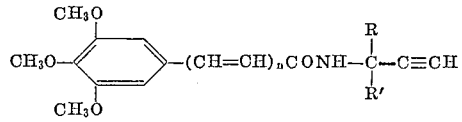

wherein $n$ is selected from the group consisting of 0 and 1 and wherein R and R' both are loweralkyls.

2. N - (1 - ethyl - 1 - methylpropynyl) - 3,4,5 - trimethoxybenzamide.

3. N - (1 - methyl - 1 - n - propylpropynyl) - 3,4,5-trimethoxybenzamide.

4. N - (1 - methyl - 1 - n- propylpropynyl) - 3,4,5-trimethoxycinnamide.

5. N - (1 - ethyl - 1 - methylpropynyl) - 3,4,5 - trimethoxycinnamide.

6. N - (1,1 - dimethylpropynyl) - 3,4,5 - trimethoxybenzamide.

7. N - (1,1 - dimethylpropynyl) - 3,4,5 - trimethoxycinnamide.

References Cited in the file of this patent

UNITED STATES PATENTS

| | | |
|---|---|---|
| 2,901,507 | Speeter et al. | Aug. 25, 1959 |
| 3,036,128 | Moffett | May 22, 1962 |

OTHER REFERENCES

Hennion et al.: Jour. Am. Chem. Soc., vol. 75, pages 1653–1654, (1953).